United States Patent [19]
von Bieren

[11] Patent Number: 4,498,773
[45] Date of Patent: Feb. 12, 1985

[54] PENCIL BEAM INTERFEROMETER

[75] Inventor: Karlheinz von Bieren, Camarillo, Calif.

[73] Assignee: Rockwell International Corporation, El Segundo, Calif.

[21] Appl. No.: 491,496

[22] Filed: May 4, 1983

[51] Int. Cl.³ .............................................. G01B 9/02
[52] U.S. Cl. .................................... 356/360; 356/376
[58] Field of Search ............... 356/357, 359, 360, 371, 356/376

[56] References Cited

U.S. PATENT DOCUMENTS

| | | |
|---|---|---|
| 3,644,016 | 2/1972 | Macken . |
| 3,715,165 | 2/1973 | Smith .............................. 356/376 X |
| 3,775,582 | 11/1973 | Iceland . |
| 3,877,813 | 4/1975 | Hayes et al. . |
| 4,188,122 | 2/1980 | Massie et al. . |
| 4,208,128 | 6/1980 | Thompson et al. . |
| 4,273,444 | 6/1981 | Pool et al. . |
| 4,273,445 | 6/1981 | Thompson et al. . |
| 4,298,283 | 11/1981 | Makosch et al. .................... 356/351 |
| 4,340,304 | 7/1982 | Massie . |
| 4,346,999 | 8/1982 | Massie . |
| 4,353,650 | 10/1982 | Sommarghen ...................... 356/371 |

OTHER PUBLICATIONS

Williams, "Quality Assurance of Aspheric Surfaces" Proc. SPIE. vol. 109, pp. 52–57, 1/1977.
Eastman, "The Scanning Fizeau Interferometer: an Automated Instrument for Characterizing Optical Surfaces" Optical Engineering, vol. 19, No. 6, pp. 810–814, 12/1980.
Hayes et al., "Testing of Nonlinear Diamond–turned Reflections", Applied Optics vol. 20, No. 2, pp. 235–239, 1/1981.

Primary Examiner—Davis L. Willis
Attorney, Agent, or Firm—H. Fredrick Hamann; Harry B. Field

[57] ABSTRACT

An interferometer which provides for the precise figure measure of optical surfaces through the interference of two pencil beams, reflected off the optical surface, comprises a laser for generating a laser beam which is split into two parallel beams by a beam splitter and a mirror, the two pencil beams are reflected off a second beam splitter, through an alignment invariant optical device and onto the optical surface to be measured. The two pencil beams are reflected and back-trace through the alignment invariant optical device, propagate through the second beam splitter and enter an optical lens which is capable of focusing two beams in its back focal plane where the interference of the two pencil beams takes place. This information is then relayed through optical spatial filter and optional micro objective into the read-out section.

7 Claims, 4 Drawing Figures

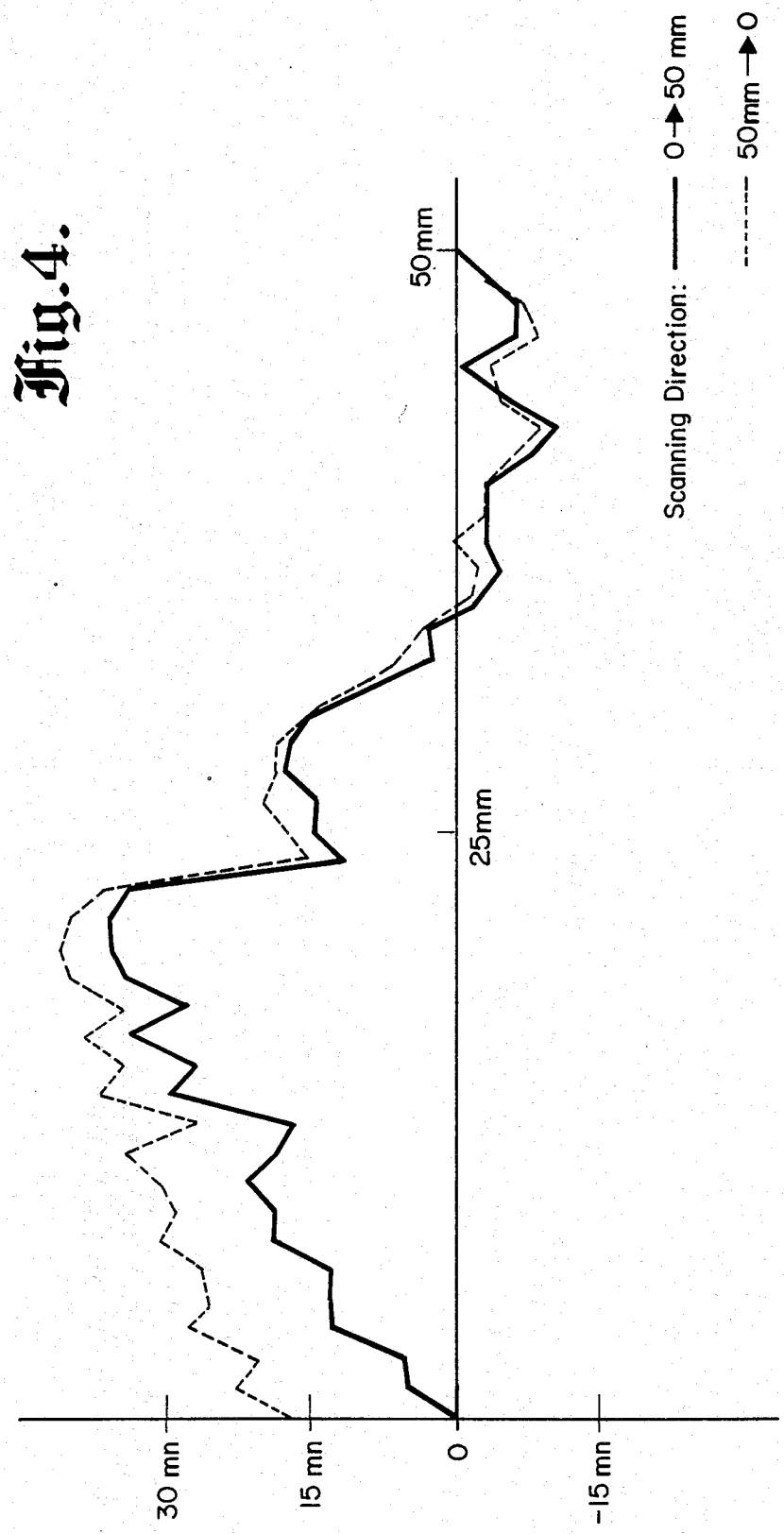

PENCIL BEAM INTERFEROMETER

BACKGROUND OF THE INVENTION

1. Field of the Invention

This invention pertains to interferometric metrology of optical surfaces and, more specifically, to the precise measurement of reflective optical surfaces as used in lasers and reflective telescopes.

2. Description of the Prior Art

Three types of interferometers are commonly used as surface measuring instruments: the Twyman-Green Interferometer (F. Twyman, A. Green, British Pat. No. 103,832, 1916); Shearing Interferometer (W. J. Bates, Proc.Phys.Soc.London, 59,940,1947) and Fizeau Interferometer (H. Fizeau, Ann.Chim. Phys., 3, 66, 1962, 429). All three interferometers require high-quality input wavefronts and with the exception of the shearing interferometer, high quality reference surfaces are necessary. By multiple exposure interferograms and three nearly identical reference surfaces the achievable precision in the surface measurement approaches $\lambda/100$ (G. D. Dew: The Measurement of Optical Flats, J. Sci. Instr. 1966, Vol. 43).

New electronic readout schemes implemented into these interferometers allow for high speed interpretation of the resulting fringe patterns, e.g., heterodyne interferometry (J. A. Wyant: Use of Heterodyne Interferometry in Optical Testing, JOSA 1974, 1363).

One general constraint of all interferometers is the requirement that the interfering wavefronts must be spherical. Consequently, the testing of aspherical surfaces requires auxiliary optics which converts the aspherical wavefront into a spherical one (A. Offner, A. Null Corrector for Paraboliodal Mirrors, Appl. Optics, February 1963, 153). Recently, holography has been applied successfully to replace the auxiliary optics in interferometry of aspherical optical surfaces (P. M. Emmel et al: Holographic and Shearing Interfer. for Optical Testing Including Aspherics, JOSA 1978, 1416); since the required shape of the aspherics is known, the necessary hologram can be generated by a computer. Unfortunately, the computer generated holograms required to test steep aspherics are also difficult to produce (J. C. Wyant et al, Computer Generated Holograms; Null Lens Test of Aspheric Wavefronts, Appl. Opt. December 1974, 2762).

A high resolution non-interferometric surface measurement scheme has recently been reported (A. E. Ennos: High Accuracy Profile Measurement of Quasi-Conical Mirror Surfaces by Laser Auto-Collimation, Precision Engineering, Vol.4, #1, January 1982). Here the slope of the surface-reflected laser pencil beam is measured with high accuracy via high precision readout electronics. The accuracy of the surface profile measurement is reported to be $\pm 2$ nm.

The Pencil Beam Interferometer is a variation of the Fan Trace Interferometer (K. von Bieren, Wavefront Investigation of a Fourier Transform Lens which the Fan Trace Interferometer, Appl. Opt. July 1973, 1642) which has been adapted to measure reflective surface profiles to a high degree of accuracy. Unlike the previously-mentioned interferometers, it requires neither a high-quality, large-aperture input wave to measure large aperture optics nor a reference wavefront. Hence, the pencil beam interferometer is suitable for the measurement of surface profiles of spherical as well as aspherical optics.

SUMMARY OF THE INVENTION

Accordingly, the pencil beam interferometer provides precision figure information of optical surfaces without the requirement of precision reference surfaces nor a precision large aperture wavefront. Hence, this interferometer seems well suited for the direct figure measurement of aspheric optical surfaces. The figure measurement in this case is accomplished by selecting the scanning geometry such that the pencil beams, reflected off the optical surface to be tested, remain within the principal planes of the optical surface. A spatial filter in the interferometer provides for a well-defined separation of the figure measurement from surface irregularities; for instance, the separation of the effect of the diamond turning grooves from the surface figure. Since the accuracy of the figure measurement is extremely high—surface figure accuracies of 2 nm have been established—this instrument may also be used for the metrology of optical elements designed for the ultra-violet or X-ray spectrum where surface figure accuracy becomes paramount.

The thermal drift problem can be reduced considerably if the scanning and readout features are automated such that the measurement of a scan takes only a few seconds. The pencil beam interferometer can also be extended to provide two-dimensional figure information by scanning three or more non-planar pencil beams over the optical surface under investigation.

OBJECTS OF THE INVENTION

Therefore, it is an object of the present invention to provide a means for measuring optical surfaces.

Another object of the present invention is to provide a means for measuring aspherical optical surfaces.

Yet a further object of the present invention is to provide means for measuring optical surfaces without the need of a reference surface.

Other objects, advantages and novel features of the present invention will become apparent from the following detailed description of the invention when considered in conjunction with the accompanying drawings.

BRIEF DESCRIPTION OF THE DRAWINGS

FIG. 4 is a graphical representation of the Surface Figure of a Test Plate.

DESCRIPTION OF THE PREFERRED EMBODIMENTS

Figure 1:
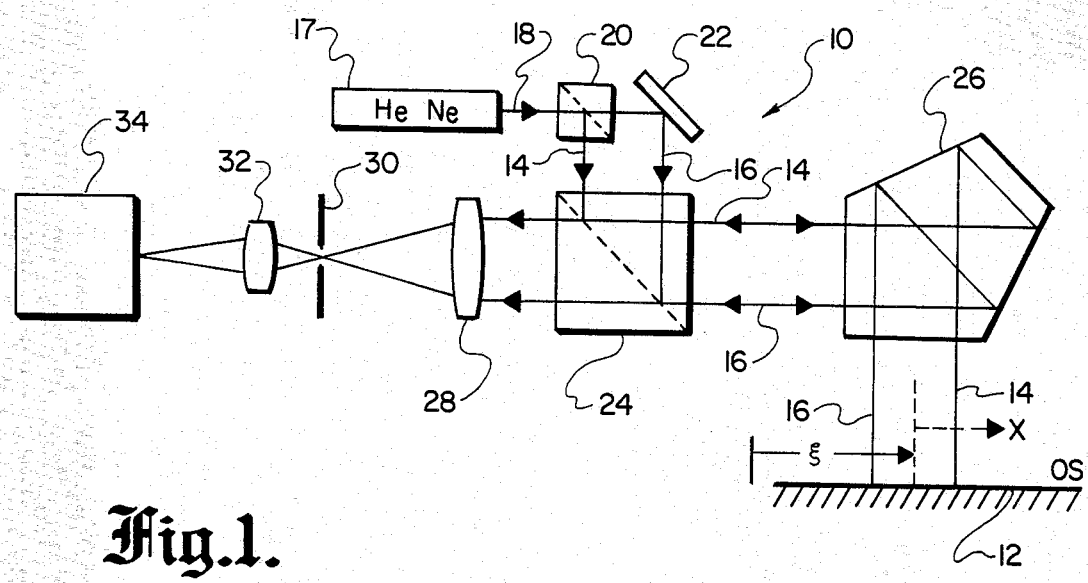
FIG. 1 is a schematic of the Pencil Beam Interferometer for measuring Optical Surfaces.

Turning now to FIG. 1, there is shown the pencil beam interferometer generally designated 10. Pencil beam interferometer 10 provides figure information on optical surface 12 through interference of two pencil beams 14,16 which sample the optical surface 12. The surface figure information is first transformed into a phase difference of the two sample beams. Upon interference of the two pencil beams 14,16, the phase difference function translates into a fringe position information. The two parallel pencil beams 14,16 are generated from laser 17 and the laser beam 18 by the beam splitter 20 and mirror 22. After reflection off the second beam splitter 24 and alignment invariant optical device 26, the two pencil beams 14,16 impinge onto the optical surface 12 whose figure is to be determined. The two reflected beams back-trace through the alignment invariant optical device 26, propagate through the second beam splitter 24, and enter an optical lens 28 capable of focusing two beams in its back focal plane where the interference of the two beams 14,16 takes place. The optical lens 28 is a Fourier transform lens. This information is relayed through optional spacial filter 30 and optional micro objective 32 into the readout section 34.

It should be noted that although FIG. 1 shows that the alignment invariant optical device 26 is a penta prism, other alignment invariant optical devices 26 include prisms in general, deflection prisms, and rhomb prisms. Each of these alignment invariant optical devices 26 can be used to measure different-type surfaces. The concept of the interferometer may be established by way of the Fourier transform property of optical lens systems (J. W. Goodman, Introduction to Fourier Optics). The amplitude distribution u(xy) in the input plane of lens system 28 may be described by $$u(xy) = \text{circ} \frac{\sqrt{\left(x - \frac{M}{2}\right)^2 + y^2}}{T} e^{j\frac{4\pi}{\lambda}\left[\frac{(\xi - \frac{M}{2})^2}{2R} + \Delta(\xi - \frac{M}{2})\right]} + \text{circ} \frac{\sqrt{\left(x + \frac{M}{2}\right)^2 + y^2}}{T} e^{j\frac{4\pi}{\lambda}\left[\frac{(\xi + \frac{M}{2})^2}{2R} + \Delta(\xi + \frac{M}{2})\right]} \quad (1)$$

Hence, the two beams of unit amplitude within the circ function outline of diameter T are separated by the distance M along the x dimension. The optical surface 12 is assumed to be spherical with radius of curvature R and with small deviations from sphericity indicated by the aberration function $\Delta(\xi)$. The diameter T of the circ functions is small enough that the phase functions may be considered to be independent of x and y Therefore, the phase function only depends upon the shift parameter $\xi$ (parallel to x) of the optical surface. Also the radius of curvature R is considered large enough for the parabolic approximation to be valid.

By the rules of Fourier transform, the power spectrum $U(x_1,y_1)$ in the focal plane (with coordinates $x_1 y_1$) of the lens 28 with focal length F becomes:

$$U(x_1 y_1) = 2 \frac{J_1^2\left(\frac{2\pi}{\lambda}\sqrt{x_1^2 + y_1^2}\right)}{x_1^2 + y_1^2} \left\{1 + \cos \frac{4\pi}{\lambda}\left[\frac{x_1 M}{F} - \frac{\xi M}{R} + \Delta\left(\xi - \frac{M}{2}\right) - \Delta\left(\xi + \frac{M}{2}\right)\right]\right\} \quad (2)$$

where $J_1$ is a Bessel function of the first kind, order zero.

The fringes which develop in the focal plane of the lens 28 may be analyzed with respect to spatial frequency f and phase shift $\Phi$.

$$\bar{f} = \frac{2M}{\lambda F} \quad (3)$$

$$\Phi = \frac{4\pi}{\lambda}\left[\frac{\xi M}{R} + \Delta\left(\xi - \frac{M}{2}\right) - \Delta\left(\xi + \frac{M}{2}\right)\right] \quad (4)$$

Hence, the phase shift parameter $\Phi$ contains the desired information with respect to radius of curvature R as well as with respect to the aberration function $\Delta(\xi)$. The interferometric measurement process of the optical surface therefore consists of the recording of Equation (4) with the number of traces determined by the sampling requirement of the optical surface.

A scan across the optical surface provides the fringe phase shift function $\Delta(\xi)$. According to Equation (4), the following relation must hold along this trace.

$$\Phi = \frac{4\pi}{\lambda}\left[\frac{\xi M}{R} + \Delta\left(\xi - \frac{M}{2}\right) + \Delta\left(\xi + \frac{M}{2}\right)\right] \quad (4)$$

Differentiation of this equation twice with respect to $\xi$ results in $$\frac{d^2\Phi}{d\xi^2} = \frac{4\pi}{\lambda}\left[\frac{d^2\Delta\left(\xi - \frac{M}{2}\right)}{d\xi^2} + \frac{d^2\Delta\left(\xi + \frac{M}{2}\right)}{d\xi^2}\right] \quad (5)$$

A Fourier transform of Equa. (5) now leads to $$\tilde{F}[\Phi(\xi)] = -\frac{8\pi}{\lambda} j \tilde{F}[\Delta(\xi)] \sin \pi f M \quad (6)$$

where $\tilde{F}[\,]$ indicates the Fourier transform of the function in the square bracket and f designates the coordinate in the Fourier domain. The aberration function $\Delta(\xi)$ may now be extracted from Equa. (6) by an inverse Fourier transform, designated by $\tilde{F}^{-1}[\,]$.

$$\Delta(\xi) = \frac{\lambda j}{8\pi} \tilde{F}^{-1}\left[\frac{\tilde{F}[\Phi(\xi)]}{\sin \pi f M}\right] \quad (7)$$

Hence, the prescription for the recovery of the aberration function $\Delta(\xi)$ is first the development of the Fourier transform of the fringe phase shift function $\phi(\xi)$ followed by the division of sin $\pi$ f M and in inverse Fourier transform of the resulting expression. Once the function $\Delta(\xi)$ has been established, the radius R may be determined by reference to Equation (4).

The difficulty which arises upon the inverse Fourier transform in Equa.(7) of infinite integrands (other than at f=0) can be avoided by a proper choice of M in relation to the length W of the trace $\phi(\xi)$. Since the sampling theorem in the frequency domain (P. M. Woodward: Probability and Information Theory with Applications to Radar, Pergamon Press) provides for the exact representation of the function $\tilde{F}[\phi(\xi)]$ through sample values spaced 1/W apart, the requirement for finite integrands through the frequency range of interest can be satisfied if the ratio W/M is selected accordingly.

Figure 2:
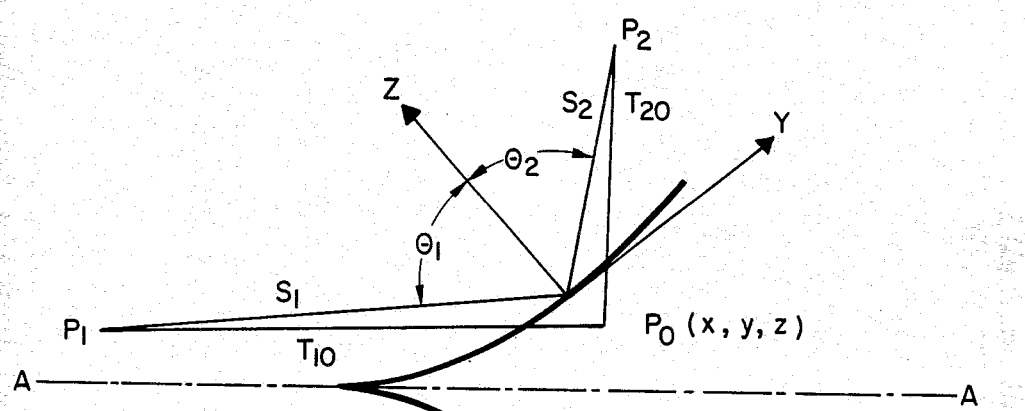
FIG. 2 is a graphical representation of a reflection off Aspheric Surface.

A typical aspheric optical element used in some high energy laser systems is the non-linear axicon shown in FIG. 2. These elements are rotation symmetric with axis of rotation A—A. The point of incidence of the pencil beam chief ray on the axicon defines the location of the Catesian coordinate system, with the z coordinate coincident with the surface normal and y-z plane containing the axis of rotation.

The properties of the pencil beam after reflection will be determined by way of the Rayleigh-Sommerfeld diffraction formula (J. Goodman: Introduction to Fourier Optics):

$$u(P_2) = \frac{A}{j\lambda} \iint_\Sigma \frac{e^{j\frac{2\pi}{\lambda}(r_{20} + r_{10})}}{r_{20} r_{10}} \cos(n_1 r_{20}) ds \quad (8)$$

$r_{10}$ is the distance between the "object" point $P_1$ and the aperture point $P_0$ and $r_{20}$ is the distance between the "image" point $P_2$ and the aperture point $P_0$. For very narrow pencil beams, the denominator $r_{20} r_{10}$ and the function $\cos(n_1 r_{20})$ may be considered to be constant, while the phase function $r_{20} + r_{10}$ will be developed up to second order terms in x and y.

Defining the object point ($P_1$) coordinates and the image point ($P_2$) coordinates by
$P_1$ coordinates: $x=0$, $y=s_1 \sin\theta_1$, $z=s_1 \cos\theta_1$,
$P_2$ coordinates: $x=0$, $y=s_2 \sin\theta_2$, $z=s_2 \cos\theta_2$
and the radius of curvature at the origin in the plane $y=0$ by $\rho_1$ and in the plane $x=0$ by $\rho_2$, the phase function $(r_{20}+r_{10})$ developed up to second order terms in x and y becomes:

$$r_{20} + r_{10} = s_1 + s_2 + \tfrac{1}{2}\left(\frac{1}{s_1} + \frac{1}{s_2} - \frac{\cos\theta_1 + \cos\theta_2}{\rho_1}\right) x^2 + \tfrac{1}{2}\left(\frac{\cos^2\theta_1}{s_1} + \frac{\cos^2\theta_2}{s_2} - \frac{\cos\theta_1 + \cos\theta_2}{\rho_2}\right) y^2 - (\sin\theta_1 + \sin\theta_2)y \quad (9)$$

The solution to the two-dimensional diffraction integral (8) will be provided by the method of stationary phase (Born & Wolf, Principles of Optics, page 753). Therefore, the following partial derivatives are developed:

$$\frac{\partial(r_{20} + r_{10})}{\partial x} = \left(\frac{1}{s_1} + \frac{1}{s_2} - \frac{\cos\theta_1 + \cos\theta_2}{\rho_1}\right) x$$

$$\frac{\partial(r_{20} + r_{10})}{\partial y} = \left(\frac{\cos^2\theta_1}{s_1} + \frac{\cos^2\theta_2}{s_2} - \frac{\cos\theta_1 + \cos\theta_2}{\rho_2}\right) y - (\sin\theta_1 + \sin\theta_2)$$

$$\frac{\partial^2(r_{20} + r_{10})}{\partial x^2} = \frac{1}{s_1} + \frac{1}{s_2} - \frac{\cos\theta_1 + \cos\theta_2}{\rho_1}$$

-continued $$\frac{\partial^2(r_{20} + r_{10})}{\partial y^2} = \frac{\cos^2\theta_1}{s_1} + \frac{\cos^2\theta_2}{s_2} - \frac{\cos\theta_1 + \cos\theta_2}{\rho_2}$$

$$\frac{\partial^2(r_{20} + r_{10})}{\partial x \partial y} = 0$$

At the critical point of the first kind, the following conditions must hold:

$$\frac{\delta(r_{20} + r_{10})}{\delta x} = \frac{\delta(r_{20} + r_{10})}{\delta y} = 0 \quad (10)$$

Equation (10) can only be satisfied if $x = y = 0$ and $\theta_1 = -\theta_2$.

Hence, a stationery point exists only for the reflected ray with the surface contributions near $x=y=0$. The value of the integral therefore becomes:

$$u(P_2) = \frac{A}{\sqrt{\left|\left(\frac{1}{s_1} + \frac{1}{s_2} - \frac{2\cos\theta_1}{\rho_1}\right)\left(\frac{1}{s_1} + \frac{1}{s_2} - \frac{2}{\cos\theta_1 \rho_2}\right)\right|}} \frac{e^{j\frac{2\pi}{\lambda}(s_1 + s_2)}}{s_1 s_2} \quad (11)$$

The disturbance $u(P_2)$ approaches infinity when one of the bracket expressions in the denominator of Equa. (11) becomes zero. Infinite values of the disturbance in this asymptotic evaluation of the diffraction integral indicates the existence of foci. Hence, there are two foci associated with the diffraction process which may be determined by the conditions when the bracket expressions in Equa. (11) become zero:

$$\frac{1}{s_1} + \frac{1}{s_2} = \frac{2\cos\theta_1}{\rho_1} \quad (12)$$

$$\frac{1}{s_1} + \frac{1}{s_2} = \frac{2}{\cos\theta_1 \rho_2} \quad (13)$$

Equations (12) and (13) are the Coddington equations for reflecting surfaces (Jenkins and White, Fundamentals of Optics, page 149). Reference to Equa.(9) as well as to its derivatives indicates that Equa.(12) defines the focusing process in the sagittal plane, while Equa.(13) represents the ray distribution in the tangential plane ($x=0$). Consequently, the tangential focal line is normal to the plane $x=0$ while the sagittal focal lines is located within the tangential plane $x=0$. Both focal lines intersect the reflected ray at right angles (A. Gullstrand, Tatsachen and Fiktionen in der Lehre von der optischen Abildung, Archiv fur Optik, Verlag von Veit & Comp. Leipzig, 1908), with the distances along the reflected ray determined by Equa.(12) and (13).

Hence, the diffraction process up to second order may be determined by tracing a chief ray through the optical system and by computing the focal properties of the astigmatic wavefronts after each reflection with the help of Equa. (12) and (13), provided the chief ray remains in the tangential plane. If the chief ray during its propagation through the optical system leaves the tangential plane, a screw ray treatment becomes necessary. The diffraction process up to second order for this case may still be determined by computing the focal properties of the wavefront associated with the (scew) chief ray. However, now the focal lines no longer maintain their orientation during reflection, but rotate around the chief ray. The various focal parameters for this case may be computed with the help of the Sturm equations (J. C. Sturm, Memoire sur L'optique, Liouv. Journ. Vol.3, 1838).

The asymptotic integral derivation in the previous paragraph provides information about the amplitude distribution along the reflected ray only. If we consider a bundle of rays, then the phase function in Equa.(11) indicates a simple optical path length relationship along the reflected rays of the bundle for various values of $s_1$ and $s_2$. The amplitude of selected rays of the ray bundle, however, varies in a complicated fashion. Therefore, taken as a complete ray bundle, the amplitude of the reflected pencil beam in general is not constant. This amplitude disturbance gives rise to diffraction, causing an angular spectrum of plane waves which clearly must exist as soon as the amplitude distribution indicated in Equa. (11) forms upon reflection. The angular spectrum of the reflected pencil beam may be computed by Fourier transform of the amplitude disturbance (J. W. Goodman: Introduction to Fourier Optics).

Figure 3:
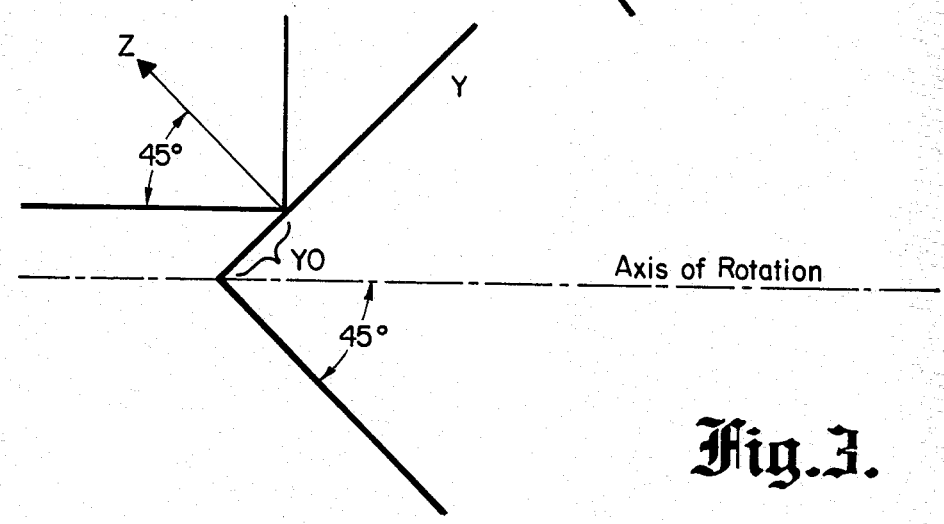
FIG. 3 is a graphical representation of a reflection of a pencil beam off an aspherical surface.

As an example, we compute the one-dimensional angular spectrum of an extended pencil beam which is reflected off a conic surface, FIG. 3.

The incident pencil beam is parallel to the axis of rotation of the conic surface, with cone apex angle 90°, said impinges on the surface a distance $y_o$ from the tip of the cone. If we develop the amplitude contribution of Equa. (11) for these conditions up to the linear term in y, the following expression for the amplitude $A_r(y)$ of the reflected beam in the vicinity of $y = y_o$ results:

$$A_R(y) = A \left( 1 + \tfrac{1}{2} \frac{y}{y_o} \right) \quad (14)$$

With the incident beam $A_i$ of diameter T described by the one-dimensional function $$A_i = rect \frac{y}{T}, \quad (15)$$

the following angular spectrum with $\alpha$ designating the direction cosinus, results:

$$F(\alpha) = \quad (16)$$

$$T \frac{\lambda \sin \frac{\alpha \pi}{\lambda} T}{\pi T \alpha} \left[ 1 + \frac{\lambda e^{-j\frac{\pi}{2}}}{4\pi \alpha y_o} \right] - \frac{T\lambda}{4\pi \alpha y_o} e^{-j2\pi \frac{\alpha T}{\lambda}}$$

Equa. (16) indicates the emergence of additional waves (second and third terms) in the angular spectrum caused by reflection of a narrow pencil beam off a conic surface. The disturbing terms become infinite at $\alpha = \pi/2$ where phase jumps of 180° occur. The terms apparently are important for reflection near the tip of the cone ($y_o \to 0$) where they override the conventional term in Equa. (9) and consequently alter the familiar sinc-function diffraction pattern. On the other hand, for a nearly flat surface ($y_o \to \infty$), the additional terms become negligible.

By way of Example and not limitation, the following experiment was conducted:

In order to verify the concept of the pencil beam interferometer, the figure and the curvature of a test plate were measured. Design values of the test glass of 11 cm clear aperture were radius of curvature R=243 m and a peak-to-valley irregularity (derivation from a spherical surface) of 0.06 μm.

FIG. 4 shows the result of the measure after the spherical component was extracted. The phase function $\phi(\xi)$ was measured along a trace of 50 mm at 40 intermediate locations. The read-out device used in this experiment consisted of two half-plane detectors whose separation line was positioned along the centerline of one of the fringes. The position measurement of this fringe centerline as a function of the shift parameter $\xi$ provides the phase function $\phi(\xi)$.

This electronic fringe position measurement can be performed with high accuracy, if special precautions are taken with respect to vibration; by air-cushion support of the optical table, as well as acoustic noise level control, with respect to air drafts by complete enclosure of the experimental setup and with respect to temperature through appropriate temperature control. In addition, intensity variations of the He-Ne laser must be appropriately measured and processed in the fringe position readout electronics to compensate for it. Fortunately, small angular variations of the He-Ne output beam do not affect the relative phase relationship of the two sample beams and thus do not affect the fringe position measurement.

The size of the spatial filter 30 in FIG. 1 was selected in the experiment such that only the zero-order diffracted terms from the two pencil beams were penetrating the spatial filter plane. Hence, surface irregularity terms of spatial wavelengths smaller than the pencil beam diameter do not affect the fringe contrast or the fringe position. This feature of the pencil beam interferometer provides for a well-defined separation of the surface figure from surface fine structure. For instance, with pencil beam diameters of 1 mm each, surface irregularities caused by diamond turning do not affect the surface figure measurement of the pencil beam interferometer, irrespective of the depth of the diamond tuning grooves, provided the groove spacing is smaller than 1 mm.

The linear fringe phase shift on account of the sphericity of the optical surface was measured to be $\Phi_o = 6.7873 \times 2\pi$ over a measurement interval of $\xi = 50.8$ mm. Hence, in conjunction with Equa. (4) for $\Delta \xi = 0$ and M=10.031±0.04 mm, the radius of curvature computes to $$R = \frac{4\pi}{\lambda \Phi_o} \xi \cdot M = 240.3 \pm .5 \ (m)$$

The accuracy of the measurement of the radius of curvature is limited to 0.5 m on account of the uncertainty of M as well as to a lesser extent on account of the phase measurement uncertainty.

The profile measurement in FIG. 4 shows two traces of the same profile; one trace from the abscissa coordinates zero to 50 mm and one reverse trace from 50 mm to zero. The total time required for measurement of the two traces in a non-automated manual mode was two hours; hence, at the abscissa coordinate zero the two measurements are two hours apart. The obvious deflection of the two traces is apparently due to the fact that the mirror, which was supported at three points by gravity only is not in a thermal equilibrium in spite of all customary precautions. Similar observations with regard to the thermal "drift" of optical flats during precision measurements have been reported (G. D. Dew, The Measurement of Optical Flats, J. Sci. Inst. 1977, Vol.43). The uncertainty for a 30 cm flat amounted to 27 nm during the course of a few minutes. In our case, the thermal gradient variations introduced an apparent change of 15 nm on a shorter trace but a longer time interval. The excellent fit of the two traces, especially in the range between the abscissa values 25 and 50 mm provides an indication of the measurement accuracy. This measurement uncertainty is approximately ±2 nm. The overall peak-to-valley irregularity of the test plate is 46 nm. Hence, it is well inside the design range of 60 nm.

Obviously, many modifications and variations of the present invention are possible in light of the above teachings. It is therefore to be understood that, within the scope of the appended claims, the invention may be practiced otherwise than as specifically described.

What is claimed and desired to be secured by Letters Patent of the United States is:

1. A pencil beam interferometer for measuring optical surfaces, comprises:
    a light beam;
    a first beam splitter optically oriented to receive and to split said incoming light beam into a first and a second pencil beam;
    means for deflecting said second pencil beam, wherein said deflected second pencil beam is displaced from but parallel to said first pencil beam;
    means for redirecting and transmitting said parallel pencil beams while concurrently maintaining them in parallel;
    an alignment invariant optical device disposed to receive the output of said means for redirecting and transmitting said parallel pencil beams, and wherein said alignment invariant optical device directs said pencil beams to the optical surface to be measured;
    an optical lens capable of focusing said two pencil beams in its back focal plane, and wherein said optical lens is disposed to receive the reflected pencil beams from said optical surface after they pass back through said alignment invariant optical device and said means for redirecting and transmitting said parallel pencil beams; and
    a readout section optically positioned to detect the interference pattern generated by said focused beams.

2. The interferometer of claim 1 wherein said means for redirecting and transmitting said parallel pencil beams is a second beam splitter.

3. The interferometer of claim 1 wherein said alignment invarient device is a prism.

4. The interferometer of claim 3 wherein said prism is a penta prism.

5. The interferometer of claim 3 wherein said prism is a deflection prism.

6. The interferometer of claim 3 wherein said prism is a rhomb prism.

7. The interferometer of claim 1 further comprising a spatial filter and micro objective optically aligned between said optical lens and said readout to enhance the interference pattern inputted to said readout.

* * * * *